G. H. GRAVES.
FAN.
APPLICATION FILED APR. 9, 1914.

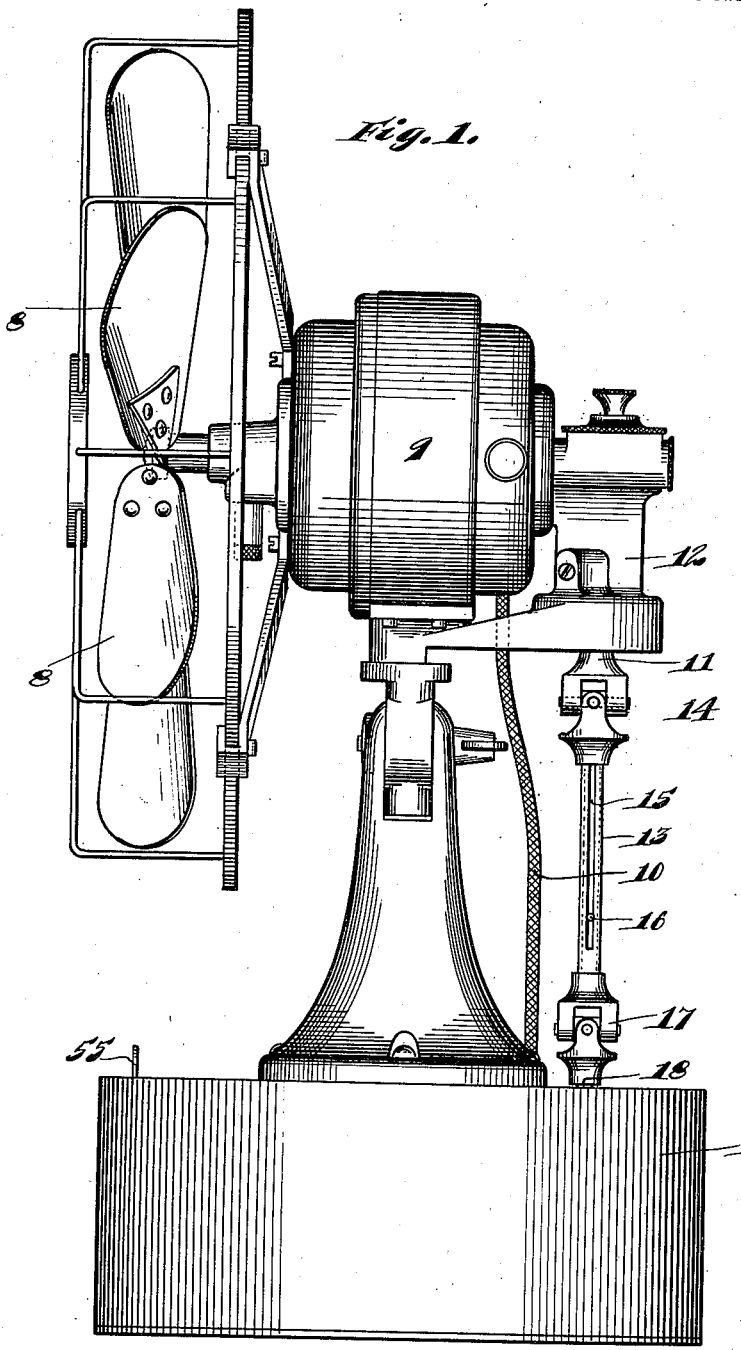

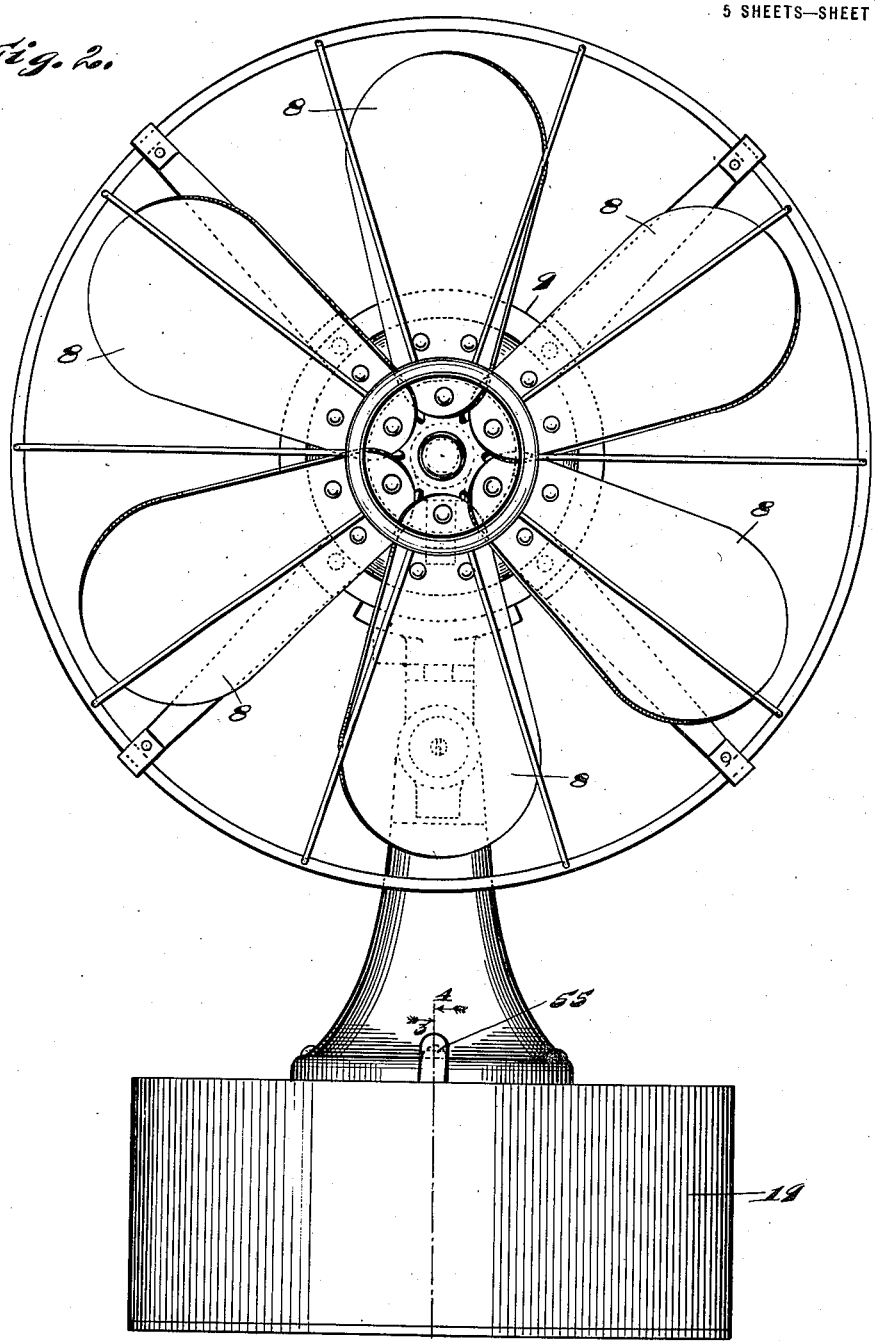

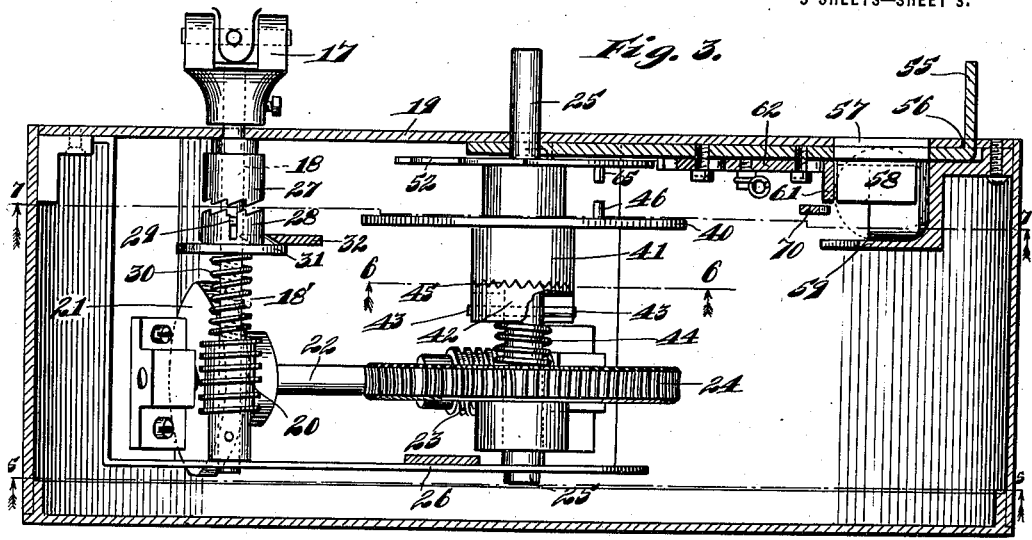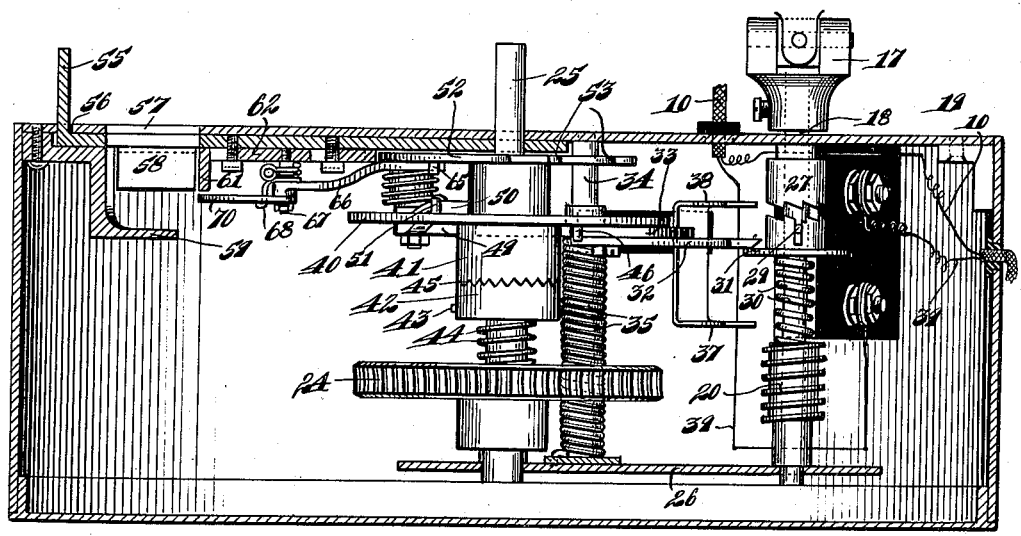

1,171,190.

Patented Feb. 8, 1916.
5 SHEETS—SHEET 4.

Witnesses:
C. E. Wessels.
B. G. Richards

Inventor:
George H. Graves,
By Joshua R. H. Potts
his Attorney.

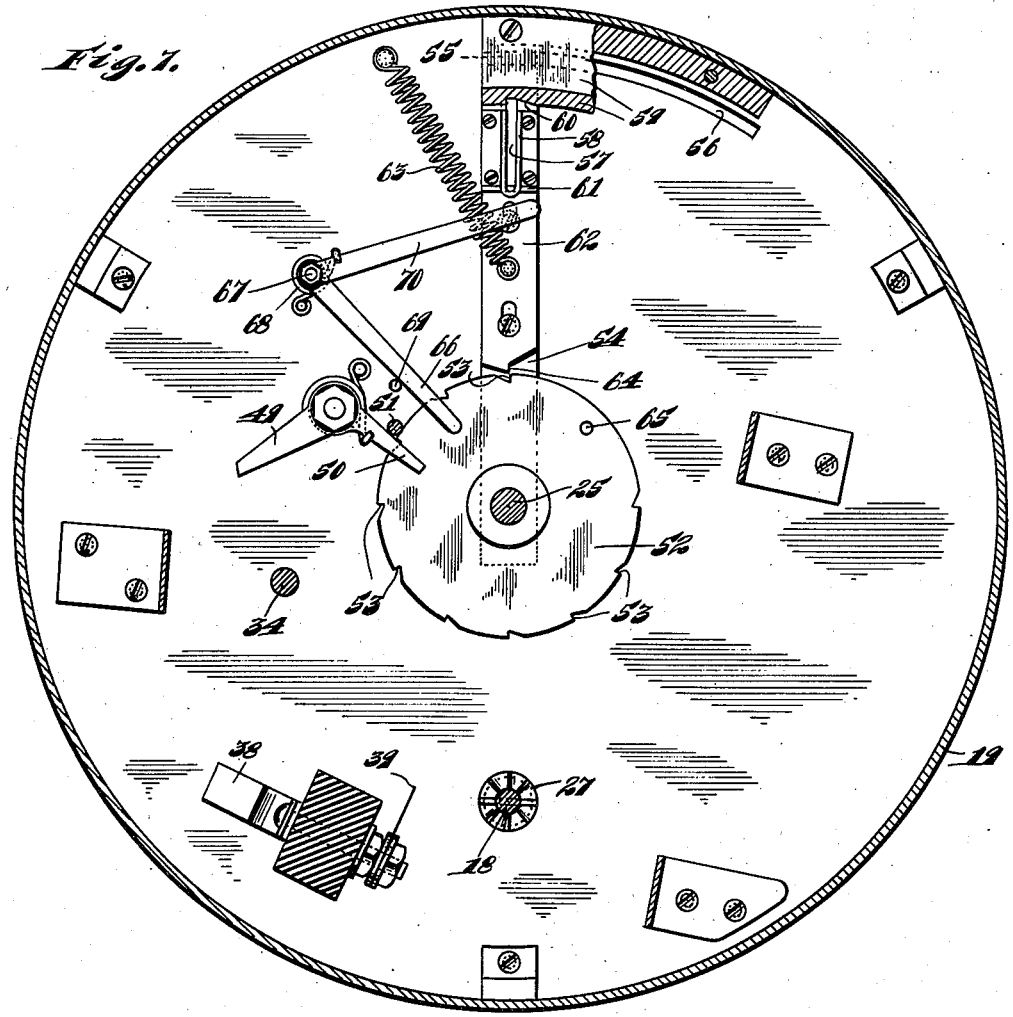

UNITED STATES PATENT OFFICE.

GEORGE H. GRAVES, OF CHICAGO, ILLINOIS, ASSIGNOR OF ONE-HALF TO HARMON M. CAMPBELL, OF CHICAGO, ILLINOIS.

FAN.

1,171,190. Specification of Letters Patent. Patented Feb. 8, 1916.

Application filed April 9, 1914. Serial No. 830,696.

*To all whom it may concern:*

Be it known that I, GEORGE H. GRAVES, a citizen of the United States, and a resident of the city of Chicago, county of Cook, and State of Illinois, have invented certain new and useful Improvements in Fans, of which the following is a specification.

My invention relates to improvements in fans and has for its object the provision of improved coin controlled mechanism for throwing the fan into and out of operation.

The invention consists in the combinations and arrangements of parts hereinafter described and claimed.

The invention will be best understood by reference to the accompanying drawings forming a part of this specification, and in which,—

Figure 5:
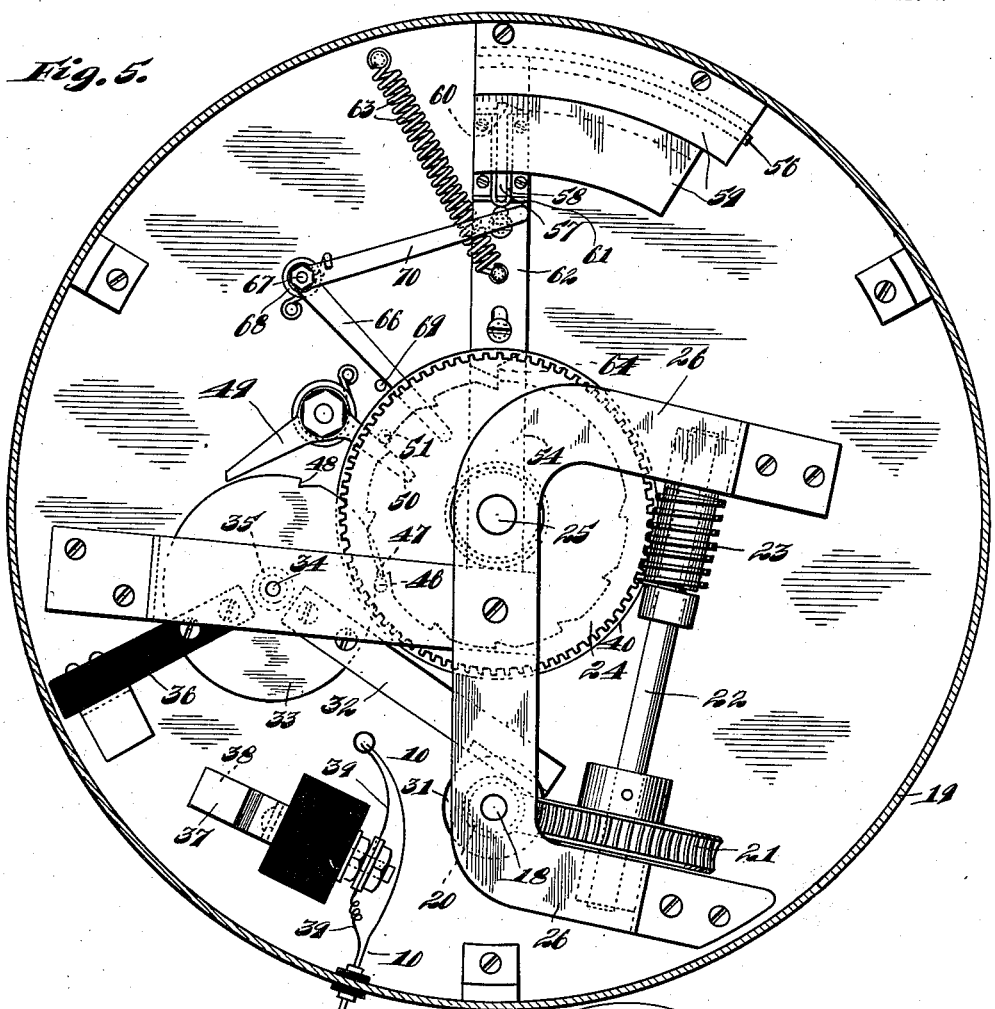
Figure 6:
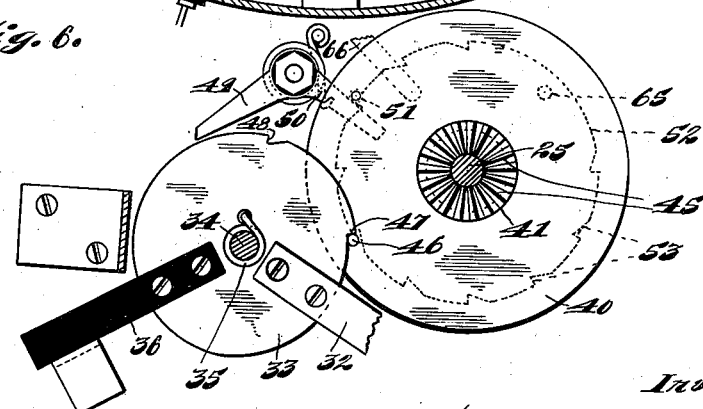

Figure 1 is a side view of a fan equipped with mechanism embodying my invention, Fig. 2, a face view of the same, Fig. 3, a central section through the base of the fan as shown in Fig. 2 and looking in the direction of the arrows 3—3, Fig. 4, a similar view looking in the direction of the arrows 4—4 on Fig. 2, Fig. 5, a section taken on the line 5—5 of Fig. 3, Fig. 6, a section taken on the line 6—6 of Fig. 3, and Fig. 7, a section taken on line 7—7 of Fig. 3.

The preferred form of construction as illustrated in the drawings comprises an ordinary electric fan 8 mounted to be operated by an ordinary electric motor 9, said motor being supplied with current through an ordinary electric cord 10, as will be readily understood. A shaft 11 is connected by a suitable reducing gearing inclosed in the housing 12 with the motor shaft, as will be readily understood. Shaft 11 is connected with a longitudinally extensible shaft 13 by means of a universal joint 14, said shaft 13 being formed in two telescoping parts, the outer part being provided with a longitudinal slot 15 and the inner part with a pin 16 slidably engaging said slot, said construction permitting of longitudinal extension of said shaft while transmitting rotation, as will be readily understood. This arrangement is provided to permit of oscillation of the fan 8 in any direction while motor 9 is driving shaft 13. At its lower end shaft 13 is connected by a universal joint 17 with the upper end of a shaft 18 mounted in the top of a hollow base 19 which serves as a support for the fan as shown. Within the base 19, shaft 18 is arranged in coaxial alinement with a shaft 18' which in turn carries a worm 20 meshing with a worm wheel 21 on a shaft 22 which in turn carries a worm 23 meshing with a worm wheel 24 fixed to the bottom of a centrally positioned vertical shaft 25 mounted in base 19 and in a bracket 26 therein. A clutch member 27 is fixed to the lower end of shaft 18 and coöperates with a clutch member 28 slidably mounted on the upper end of shaft 18', said clutch 28 having a slot and pin connection 29 with shaft 18', whereby said clutch may be moved into and out of engagement with clutch 27 to connect or disconnect shaft 18' from shaft 18, as will be readily understood. Clutch 28 is normally pressed toward engagement with clutch 27 by means of a spring 30 and is normally held from such engagement by means of a collar 31 and a knife blade 32 engaging said collar. Knife blade 32 is carried by a disk 33 which is fixed on a shaft 34 normally held in the position shown in Fig. 5 by means of a spring 35. The disk 33 also carries a switch 36 coöperating with electric contacts 37 and 38, as shown. One wire of the cord 10 is broken and one broken end connected with the contact 37 and the other end with the contact 38 so as to form a break in the motor circuit closable by switch 36, as will be readily understood. By this arrangement it will be observed, that clutches 27 and 28 are normally held from engagement so as to disconnect the motor 9 from the mechanism in the base and the motor circuit normally held broken so as to prevent operation of said motor, but that upon swinging of disk 33 the knife blade 32 will be withdrawn and switch 36 placed in operative relation with contacts 37 and 38 to connect the motor shaft with the shaft 18' and close the motor circuit simultaneously, thus causing shaft 25 to rotate but at a greatly reduced speed owing to the gearing disclosed.

A disk 40 is loosely mounted on shaft 25 and carries a clutch 41 coöperating with a clutch 42 having a slot and pin connection 43 with shaft 25, a spring 44 normally holding clutches 41 and 42 in yielding engagement with each other. The teeth 45 on clutches 41 and 42 are made V-shaped as shown in Figs. 3 and 4 so that clutch 42 will normally drive clutch 41 and consequently disk 40 but when rotation of either is prevented the teeth on clutch 42 will automatically ride out of engagement with teeth 41 to permit rotation of either clutch member while the other remains stationary. Thus, when clutch member 42 is held from rotation by the automatic locking action of the worm wheel 24 and worm 23, nevertheless the disk 40 may be rotated, as will be readily understood. Disk 40 carries a pin 46 projecting downwardly therefrom and set in position to rest normally in a notch 47 in the periphery of disk 33. Disk 33 is also provided with another notch 48 in the periphery thereof adapted to be engaged by one arm 49 of a spring held bell crank lever, the other arm 50 thereof being set in normal contact with a pin 51 projecting upwardly from disk 40. By this arrangement, it will be observed that by rotating disk 40 in a clock-hand-wise direction as shown in Fig. 5, the disk 33 will be rotated to cause knife blade 32 to disengage collar 31 and switch 36 to engage contacts 37 and 38 to close the motor circuit thus simultaneously connecting shaft 18′ with the motor shaft and at the same time starting the motor to rotate said shaft. The rotations of shaft 18′ are communicated to disk 40 through the gearing above described to cause return movement of disk 40. At the end of this return movement pin 51 contacts with arm 50 thus throwing arm 49 out of engagement with notch 48 and releasing disk 33 which, under the influence of spring 35 is rotated to withdraw switch 36 to break the motor circuit and throw knife blade 32 into engagement with collar 31 to disengage clutch 27 from clutch 28 and thus disconnect the motor from shaft 18′. By disconnecting the motor from shaft 18′ the abrupt stopping of the motor is avoided and the motor permitted to spin under the influence of its inertia without disturbing the adjustment of the parts connected therewith through the clutch 27. Another and smaller disk 52 is secured to shaft 25 above disk 40, said disk 52 being provided with a plurality of notches 53 in the periphery thereof. An operating lever 54 is pivotally mounted on shaft 25, extends radially therefrom and is provided with an upturned outer end 55 projecting through a segmental slot 56 in the top of base 19 to constitute a handle for operating said lever from the outside of said base. Registering slots 57 are formed in the top of base 19 and in lever 54 and a U-shaped coin holder 58 is secured to the bottom of said lever in position to embrace a coin inserted through said slots. A coin guide 59 is arranged around coin holder 58 and is provided in its outer wall with a cam surface 60 adapted to engage the outer edge of a coin in coin holder 58 upon swinging of lever 54 to the right when in the position illustrated in Fig. 7, thus forcing the coin to move inwardly during the initial motion of said lever. The upper portion of coin holder 58 is notched to receive the downwardly turned end 61 of a slidable catch member 62 mounted on lever 54, and normally held in its extreme outer position by means of spring 63. The inner end of catch 62 is provided with a nose or shoulder 64 adapted to engage notches 53 in the periphery of disk 52. By this arrangement, upon insertion of a suitable coin or token into coin holder 58 through slots 57, said coin will be normally held in the outer portion of said coin holder in position to strike the cam surface 60 and with its forward edge in contact with the downwardly turned end 61 of catch 62. Upon operative movement of lever 54, the outer edge of said coin will be engaged by cam surface 60 to force said coin inwardly. This inward movement of the coin will force the catch 62 inwardly to engage the corresponding notch 53 and cause rotation of disk 52 with lever 54. This rotation of disk 52 will cause simultaneous rotation of shaft 25 and consequently of disk 40 which, as explained above, will close the motor circuit and connect the motor with disk 40 to cause return movement thereof. In its return movement the motor circuit is automatically broken and the parts disconnected as explained above. If it is desired to set the apparatus for a longer period of operation a number of coins may be deposited successively through slots 57 and lever 54 operated after the deposit of each coin. This will cause the disk 52 to move through the angular distance between two of the notches and thus prolong the time consumed in the return of pin 51 to contact with arm 50, proportionately to the number of coins deposited.

The arrangement illustrated provides for the deposit of ten coins, and in order to prevent the deposit of more coins, disk 52 is provided with a downwardly extending pin 65 set to contact with an arm 66 on a shaft 67 normally held by means of a spring 68 with arm 66 in contact with a stop pin 69. Shaft 67 also carries an arm 70 which is arranged to swing across the bottom of coin holder 58 to prevent the complete insertion of a coin therein. The pin 65 is set to contact with arm 66 during the last movement of the disk 52 provided for, and thus swing arm 70 into position to prevent the insertion of another coin.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination of an electric motor; apparatus driven thereby; a hollow supporting base for said motor; an electric circuit for said motor; a pivoted switch in said base controlling said circuit; a spring normally holding said switch open; trigger mechanism arranged to lock said stitch automatically in closed position; a rotatable member arranged to release said trigger mechanism at the terminus of its movement in one direction; mechanism for rotating said member in the other direction to close said switch; means in said base for rotating said member to release said trigger mechanism; an operative connection between said motor and said means to release said trigger mechanism; a clutch between said means and said connection; means operated by said rotatable member for throwing said clutch in and out simultaneously with the closing and opening of said switch; and an operative connection between said motor and said means, substantially as described.

2. The combination of an electric motor; apparatus driven thereby; a hollow supporting base for said motor; an electric circuit for said motor; a pivoted switch in said base controlling said circuit; a spring normally holding said switch open; trigger mechanism arranged to lock said switch automatically in closed position; a rotatable member arranged to release said trigger mechanism at the terminus of its movement in one direction; mechanism for rotating said member in the other direction to close said switch; means in said base for rotating said member to release said trigger mechanism; a yieldable operative connection between said motor and said means to release said trigger mechanism; a clutch between said means and said connection; means operated by said rotatable member for throwing said clutch in and out simultaneously with the closing and opening of said switch; and an operative connection between said motor and said means, substantially as described.

3. The combination of an electric motor; apparatus driven thereby; coin controlled mechanism for closing the motor circuit; and means operable by the motor to release said mechanism and permit said mechanism to break the circuit and disconnect the said motor, substantially as described.

4. The combination of an electric motor; apparatus driven thereby; an electric circuit for operating said motor; a switch in said circuit; coin controlled mechanism for closing said switch; and means operable by the motor to release said mechanism and permit said mechanism to break the circuit and disconnect said motor from said means, substantially as described.

5. The combination of an electric motor; apparatus driven thereby; an electric circuit for operating said motor; a switch in said circuit; a spring normally holding said switch open; coin controlled mechanism for closing said switch; means operable by said motor for releasing said trigger mechanism; and means connected with said switch for disconnecting said motor from said means, substantially as described.

In testimony whereof I have signed my name to this specification in the presence of two subscribing witnesses.

GEORGE H. GRAVES.

Witnesses:
  JOSHUA R. H. POTTS,
  HELEN F. LILLIS.